United States Patent
Butler et al.

(10) Patent No.: US 9,377,210 B2
(45) Date of Patent: Jun. 28, 2016

(54) HVAC COMMUNICATION BUS DECODERS AND CORRESPONDING METHODS

(71) Applicant: Emerson Electric Co., St. Louis, MO (US)

(72) Inventors: William P. Butler, Crestwood, MO (US); Steven L. Carey, Imperial, MO (US); Joann Donelon, Kirkwood, MO (US); Edward B. Evans, Maryland Heights, MO (US)

(73) Assignee: Emerson Electric Co., St. Louis, MO (US)

( * ) Notice: Subject to any disclaimer, the term of this patent is extended or adjusted under 35 U.S.C. 154(b) by 456 days.

(21) Appl. No.: 14/134,768

(22) Filed: Dec. 19, 2013

(65) Prior Publication Data

US 2015/0176854 A1   Jun. 25, 2015

(51) Int. Cl.
*F24F 11/00* (2006.01)
*G05D 23/19* (2006.01)

(52) U.S. Cl.
CPC ............ *F24F 11/0009* (2013.01); *G05D 23/19* (2013.01)

(58) Field of Classification Search
CPC .............................. F24F 11/0009; G05D 23/19
See application file for complete search history.

(56) References Cited

U.S. PATENT DOCUMENTS

| | | | |
|---|---|---|---|
| 4,616,325 A | 10/1986 | Heckenbach et al. | |
| 5,203,497 A * | 4/1993 | Ratz | G05D 23/1905 236/46 R |
| 5,316,073 A | 5/1994 | Klaus et al. | |
| 5,511,188 A * | 4/1996 | Pascucci | G06F 9/465 |
| 5,927,398 A * | 7/1999 | Maciulewicz | F24F 11/006 165/208 |
| 7,055,759 B2 * | 6/2006 | Wacker | F24F 11/0086 165/201 |
| 7,089,088 B2 | 8/2006 | Terry et al. | |
| 7,222,800 B2 * | 5/2007 | Wruck | C09D 5/4492 165/11.1 |
| 7,434,744 B2 | 10/2008 | Garozzo et al. | |
| 7,451,606 B2 * | 11/2008 | Harrod | F24F 11/0086 62/125 |
| 7,565,813 B2 * | 7/2009 | Pouchak | G05D 23/1905 236/44 C |
| 7,748,640 B2 * | 7/2010 | Roher | F24F 11/0012 236/51 |
| 7,765,826 B2 | 8/2010 | Nichols | |
| 7,774,102 B2 | 8/2010 | Butler et al. | |
| 7,775,452 B2 * | 8/2010 | Shah | F24F 11/0086 236/51 |
| 7,979,164 B2 | 7/2011 | Garozzo et al. | |
| 8,078,325 B2 | 12/2011 | Poth | |

(Continued)

OTHER PUBLICATIONS

Carrier Heating & Cooling, SYSTXCCNIM01, Infinity Network Interface Module; 2004 ©; 4 pgs.

(Continued)

*Primary Examiner* — Ramesh Patel
(74) *Attorney, Agent, or Firm* — Harness, Dickey & Pierce, P.L.C.

(57) ABSTRACT

In exemplary embodiments, HVAC communication bus decoders and corresponding methods are disclosed. In an exemplary embodiment, an HVAC communication bus decoder includes a control circuit having an input for coupling to an HVAC communication bus and one or more relays each having an output for coupling to a legacy HVAC system monitoring device. The control circuit is configured to read one or more messages transmitted on the HVAC communication bus, decode the one or more messages to determine a desired mode of operation called for by a thermostat connected to the HVAC communication bus, and energize at least one of the one or more relays to emulate a corresponding legacy HVAC signal representing the mode of operation called for by the thermostat to be provided to the legacy HVAC monitoring device.

20 Claims, 3 Drawing Sheets

(56) References Cited

U.S. PATENT DOCUMENTS

| | | |
|---|---|---|
| 8,078,326 B2 | 12/2011 | Harrod et al. |
| 8,413,454 B2 | 4/2013 | Butler et al. |
| 8,550,368 B2 | 10/2013 | Butler et al. |
| 2007/0162245 A1 | 7/2007 | Costea et al. |
| 2008/0048045 A1 | 2/2008 | Butler et al. |
| 2008/0059833 A1* | 3/2008 | Harrod ............... F24F 11/0086 714/4.2 |
| 2008/0099568 A1* | 5/2008 | Nicodem ............ F24F 11/0012 236/51 |
| 2010/0106324 A1* | 4/2010 | Grohman .............. H04L 12/407 700/276 |
| 2010/0314458 A1 | 12/2010 | Votaw et al. |
| 2012/0273581 A1* | 11/2012 | Kolk ..................... F24F 11/006 236/91 D |

OTHER PUBLICATIONS

ClimateTalk 2.0 Generic Application Specification; Jun. 12, 2013; 55 pgs.
ClimateTalk 2.0 HVAC Application Profile; Jun. 12, 2013; 46 pgs.
ClimateTalk 2.0 CT2.0 CT-485 API Reference; Jun. 12, 2013; 48 pgs.
ClimateTalk 2.0 CT2.0 CT-485 AutoNet Pseudo-Random Nunber & Timing; Jun. 12, 2013; 13 pgs.
Technology Overview; www.climatetalkalliance.org; Nov. 11, 2013; 1 pg.
ComfortGuard™; www.emersonclimate.com; © 2013; 4 pgs.

* cited by examiner

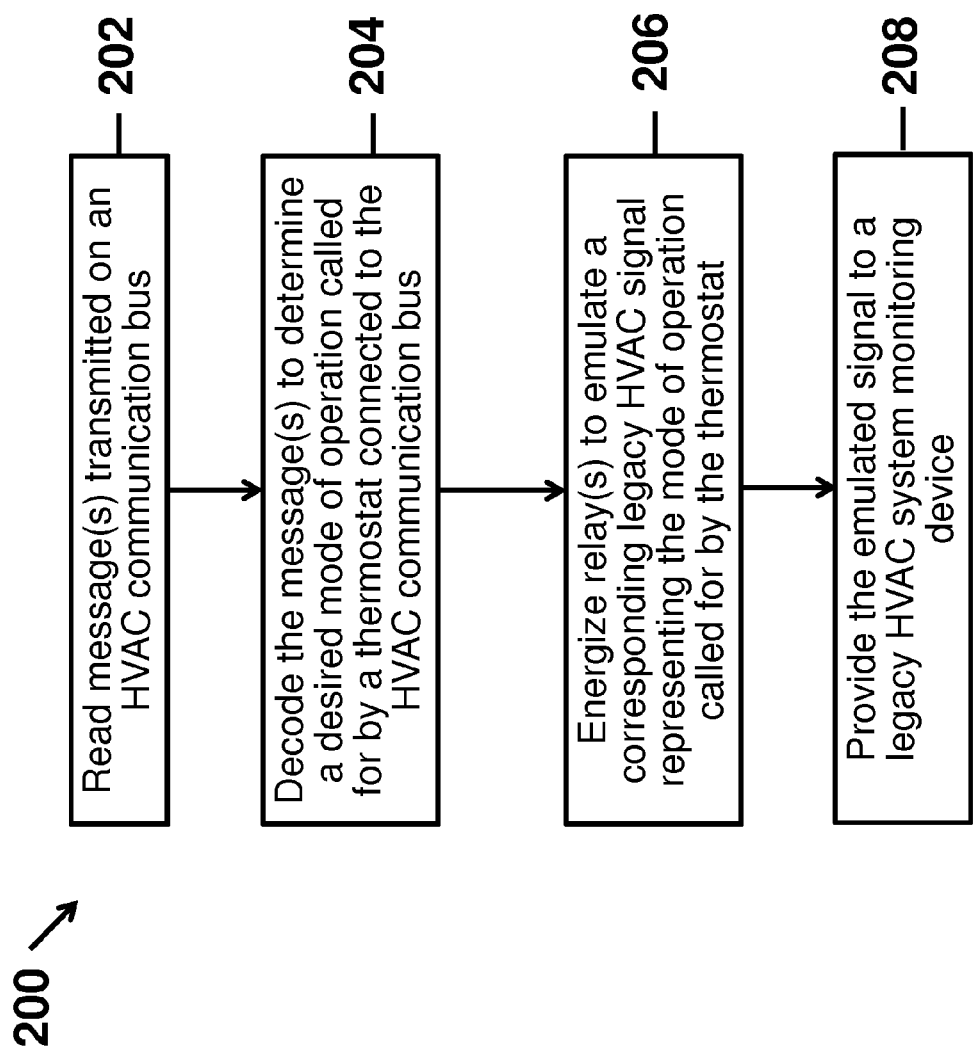

HVAC COMMUNICATION BUS DECODERS AND CORRESPONDING METHODS

FIELD

The present disclosure relates to HVAC communication bus decoders and corresponding methods.

BACKGROUND

This section provides background information related to the present disclosure which is not necessarily prior art.

Heating, ventilating and air-conditioning (HVAC) systems can be used to regulate the environment within an enclosed space. Typically, an air blower is used to pull air from the enclosed space into the HVAC system and then push the air back into the enclosed space after conditioning the air (e.g., heating, cooling or dehumidifying the air). Various types of HVAC systems may be used to provide conditioned air for enclosed spaces. Traditionally, HVAC systems have used 24VAC on/off signals to indicate which mode (e.g., first stage heating, second stage cooling, etc.) of operation is being called. In the HVAC industry today, communicating HVAC systems (e.g., ClimateTalk™, RS-Bus, etc.) provide communication between HVAC system components, but may not use legacy 24VAC signals. Some HVAC monitoring devices may be configured to receive HVAC signals to monitor activity of the HVAC system.

SUMMARY

This section provides a general summary of the disclosure, and is not a comprehensive disclosure of its full scope or all of its features.

In exemplary embodiments, HVAC communication bus decoders and corresponding methods are disclosed. In an exemplary embodiment, an HVAC communication bus decoder includes a control circuit having an input for coupling to an HVAC communication bus and one or more relays each having an output for coupling to a legacy HVAC system monitoring device. The control circuit is configured to read one or more messages transmitted on the HVAC communication bus, decode the one or more messages to determine a desired mode of operation called for by a thermostat connected to the HVAC communication bus, and energize at least one of the one or more relays to emulate a corresponding legacy HVAC signal representing the mode of operation called for by the thermostat to be provided to the legacy HVAC monitoring device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a block diagram of a method for decoding an HVAC communication bus in accordance with an exemplary implementation of the disclosure.

Corresponding reference numerals indicate corresponding parts throughout the several views of the drawings.

DETAILED DESCRIPTION

Example embodiments will now be described more fully with reference to the accompanying drawings.

Figure 1:
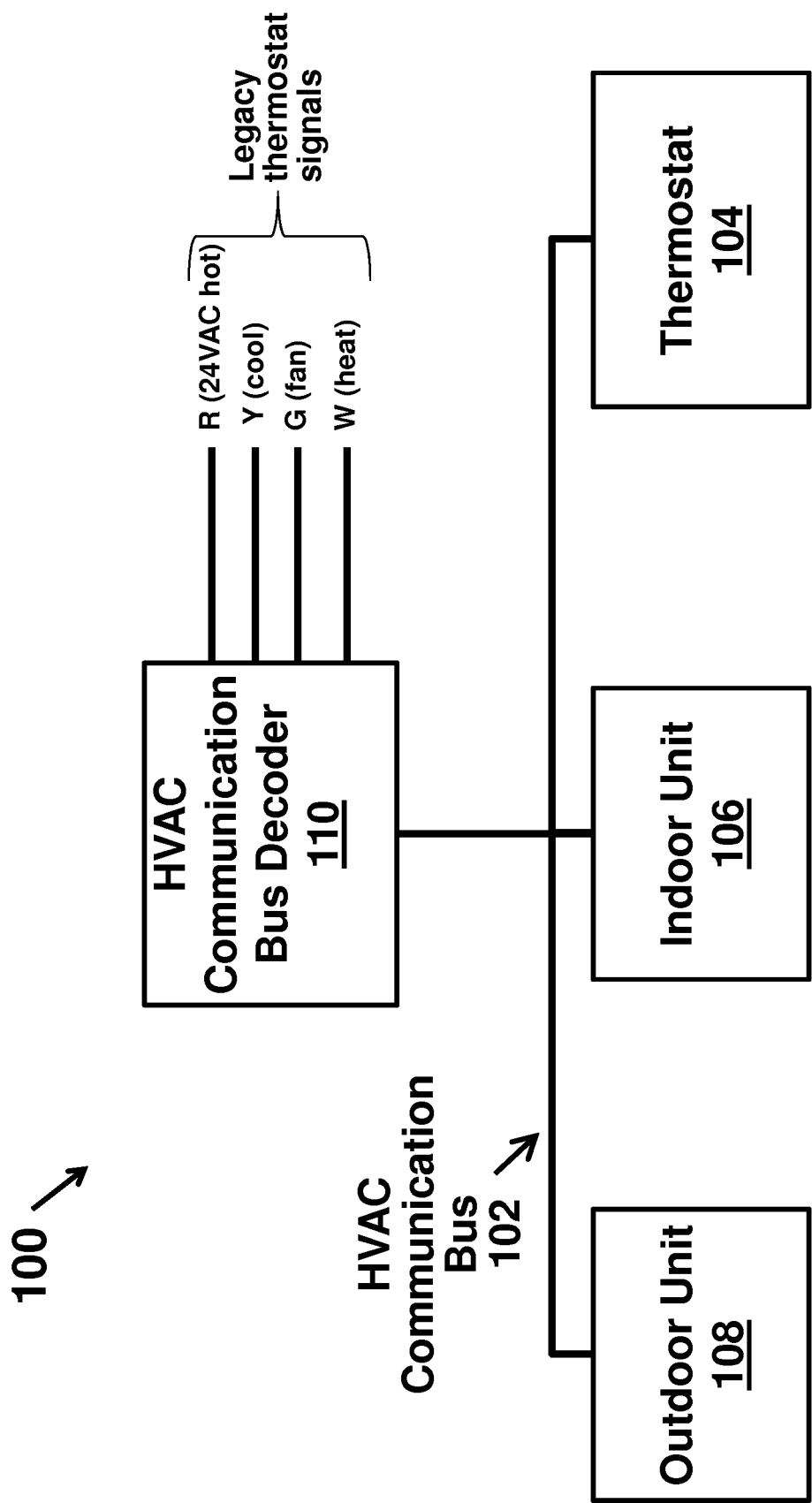
FIG. 1 is a block diagram of an example HVAC system configured in accordance with an exemplary implementation of the present disclosure.

With reference to the figures, FIG. 1 illustrates an example HVAC system 100 having an HVAC communication bus 102 connected to a thermostat 104, an indoor unit 106, an outdoor unit 108, and an HVAC communication bus decoder 110. The thermostat 104 may be any suitable device capable of sending control signals to one or more components of the HVAC system 100. The thermostat 104 may be a communicating thermostat capable of sending and/or receiving signals to and/or from one or more components of the HVAC system 100. For example, the thermostat 104 may send and receive signals to and from the indoor unit 106 and the outdoor unit 108.

The indoor unit 106 may be any HVAC system component located inside the enclosed space for which the HVAC system 100 is regulating the environment, such as, for example, a gas furnace, air handler, etc. The outdoor unit 108 may be any HVAC system component located outside of an enclosed space for which the HVAC system 100 is regulating the environment, such as, for example, an air conditioner, a heat pump, etc. Although one indoor unit 106 and one outdoor 108 unit are illustrated in FIG. 1, it is understood that other embodiments may include more or less indoor units 106 and more or less outdoor units 108.

The HVAC communication bus 102 may be any suitable bus capable of relaying signals between components of the HVAC system 100. For example, the HVAC communication bus 102 may be a four line (e.g., wire) bus having a first line for sending communication signals (e.g., a wire labeled 1), a second line also for sending communication signals (e.g., a wire labeled 2), a third line for common (e.g., a wire labeled C), and a fourth line for voltage supply (e.g., a wire labeled R). The voltage supply line may provide a twenty-four volt alternating current (24VAC) signal. In some embodiments, there may be two terminals (e.g., bidirectional terminals labeled 1 and 2, etc.) that essentially transmit or send the same information that may be compared for error checking. But in other embodiments, there may be more or less communication signal wires in the bus 102. In some embodiments, the common and voltage supply wires may be part of the bus 102. But in other embodiments, common and/or voltage supply lines may not be included as part of the bus 102. The bus 102 may use any suitable communication signal protocol for sending signals between HVAC system components, such as, for example, ClimateTalk™ developed by the ClimateTalk Alliance, RS-Bus, RS-485, etc.

The inventors have observed that some legacy HVAC system monitoring devices may be designed to receive legacy thermostat signals, such as, for example, a 24VAC signal at a cool thermostat call input (e.g., labeled as Y), a 24VAC signal at a heat thermostat call input (e.g., labeled as W), a 24VAC signal at a fan thermostat call input (e.g., labeled as G), etc. The legacy HVAC system monitoring device may be configured to receive a common input, a voltage supply input (e.g., 24VAC), etc. The legacy HVAC system monitoring device may be any suitable device capable of receiving legacy HVAC system signals for use in monitoring activity of the HVAC system. An example legacy HVAC system monitoring device is the ComfortGuard™ produced by Emerson Climate Technologies.

The HVAC communication bus decoder 110 may be coupled to the HVAC communication bus 102 to read one or more communication signals transmitted on the bus 102. The decoder 110 may be configured to decode the one or more messages to determine a desired mode of operation called for by the thermostat 104. The decoder 110 may be configured to energize one or more relays to emulate a corresponding legacy HVAC signal representing the mode of operation called for by the thermostat 104 to provide the emulated signal to the legacy HVAC system monitoring device. For example, a thermostat 104 may transmit a message on the HVAC communication bus 102 indicating a call for heat. The decoder 110 may read this message and decode it to determine the thermostat 104 is calling for heat. The decoder 110 may then energize a relay to emulate a legacy HVAC signal representing a call for heat and provide the emulated signal to a legacy HVAC system monitoring device (e.g., energize a relay to provide a 24VAC signal to a heat (W) input of the legacy HVAC system monitoring device).

The HVAC communication bus decoder 110 may be configured to detect an equipment configuration of HVAC system equipment components connected to the HVAC communication bus 102. The decoder 110 may read and decode messages transmitted on the bus 102 to determine whether there are any indoor units 106, outdoor units 108, the type of thermostat 104, etc. For example, the decoder 110 may read a call for heat transmitted on the HVAC communication bus 102 and determine a furnace is connected to the bus 102, read a call for cool and determine an air conditioner is connected to the bus 102, etc. The decoder 110 may be configured to read the messages passively, such that the decoder 110 does not send any signals out on the HVAC communication bus 102 or communicate with any components of the HVAC system 100. The decoder 110 may not identify itself to the HVAC communication bus 102 or any components of the HVAC system 100. The decoder 110 may be connected to the HVAC communication bus 102 without requiring any modification of the existing HVAC communication bus 102 and system 100 and/or without interfering with any existing operation of the HVAC communication bus 102 and system 100. In other exemplary embodiments, the decoder 110 may be configured to read the messages actively.

Figure 2:
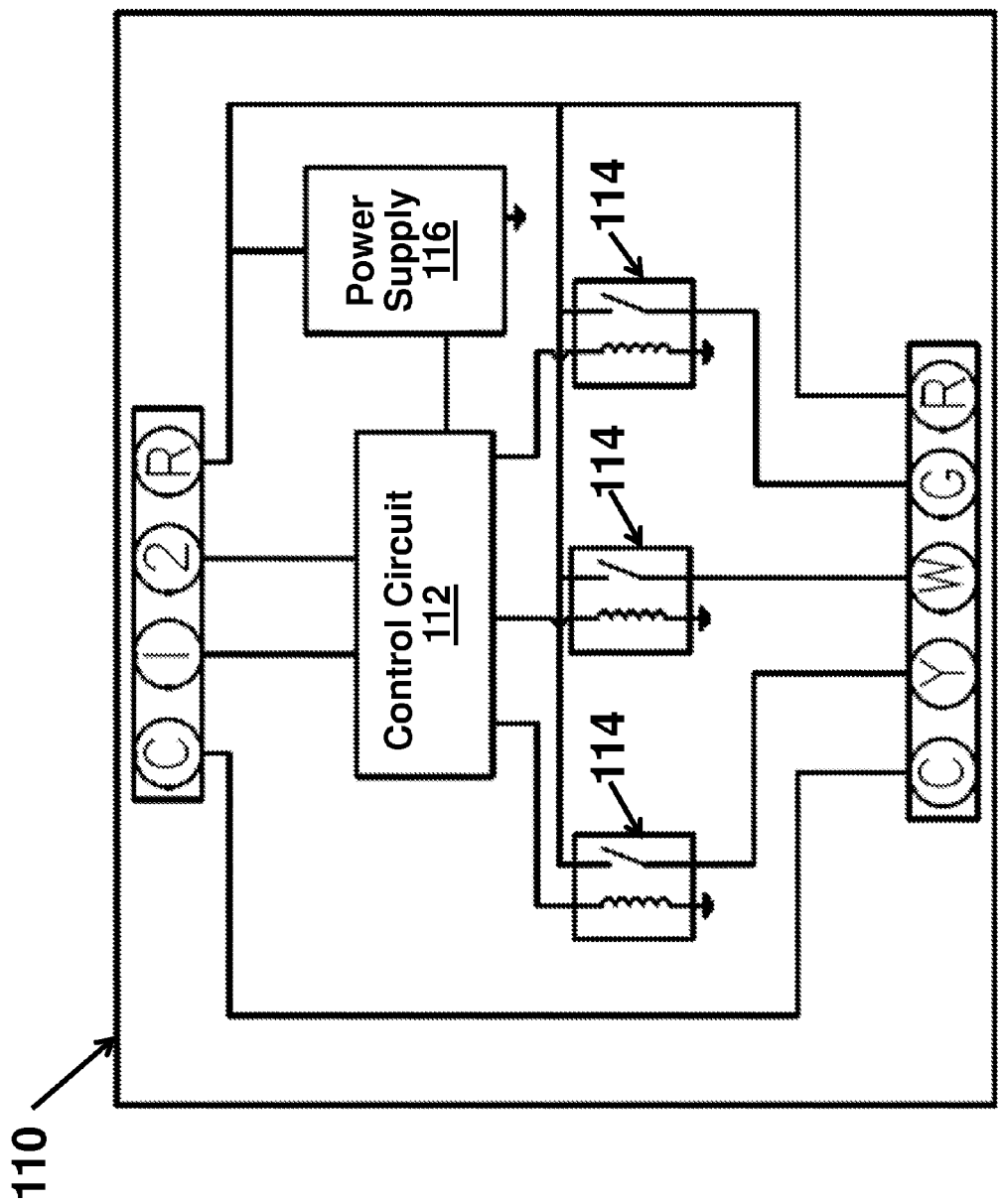
FIG. 2 is a block diagram of an example HVAC communication bus decoder in accordance with an exemplary implementation of the present disclosure.

With reference to FIG. 2, the HVAC communication bus decoder 110 may include a control circuit 112 having an input for coupling to an HVAC communication bus 102. The decoder 110 may include one or more relays 114 having an output for coupling to a legacy HVAC system monitoring device. The control circuit 112 may be configured to passively read one or more messages transmitted on the network bus 102, decode the one or more messages to determine a desired operation called for by a thermostat 104 connected to the bus 102, and energize the one or more relays 114 to emulate a corresponding legacy HVAC signal representing the mode of operation called for by the thermostat 104 to be provided to the legacy HVAC system monitoring device.

The decoder 110 may include a common input terminal (C) for coupling to a common line of the HVAC communication bus 102. The decoder 110 may include a supply input terminal (R) for coupling to a voltage supply line of the HVAC communication bus 102. The decoder 110 may include a first detection input terminal (1) for coupling to a first communication line of the HVAC communication bus 102. The decoder 110 may include a second detection input terminal (2) for coupling to a second communication line of the HVAC communication bus 102. Although first and second detection input terminals are illustrated in FIG. 2, it is understood that other embodiments may include more or less detection input terminals, which may or may not correspond to the number of communication lines of the HVAC communication bus 102.

The control circuit 112 may be coupled to the HVAC communication bus 102 through one or more of the input terminals of the decoder 110. For example, the control circuit 112 may be coupled to the first detection input terminal (1) to receive messages from the first communication line of the HVAC communication bus 102, and may be coupled to the second detection input terminal (2) to receive messages from the second communication line of the HVAC communication bus 102. Although four input terminals are illustrated in FIG. 2, it is understood that other embodiments may include more or less input terminals, which may or may not correspond to the number of lines of the HVAC communication bus 102. The control circuit 112 may be configured to compare the messages received from the first and second detection input terminals for error checking. The control circuit 112 may be any suitable control circuit capable of decoding communication signals and controlling one or more relays, such as, for example, a microprocessor, digital controller, integrated circuit, etc.

The decoder 110 may include a common output terminal (C) for coupling to a common input of a legacy HVAC system monitoring device. The decoder 110 may include a supply output terminal (R) for coupling to a voltage supply input of the legacy HVAC system monitoring device. The decoder 110 may include a cool thermostat call output terminal (Y) for coupling to a cool thermostat call input of the legacy HVAC system monitoring device. The decoder 110 may include a heat thermostat call output terminal (W) for coupling to a heat thermostat call input of the legacy HVAC system monitoring device. The decoder 110 may include a fan thermostat call output terminal (G) for coupling to a fan thermostat call input of the legacy HVAC system monitoring device. Although five output terminals are illustrated in FIG. 2, it is understood that other embodiments may include more or less output terminals, which may or may not correspond to the number of input terminals of the legacy HVAC monitoring device.

The common input terminal of the decoder 110 may be connected to the common output terminal of the decoder 110 to couple a common line of the HVAC communication bus 102 to the common input of the legacy HVAC system monitoring device. The supply input terminal of the decoder 110 may be connected to the supply output terminal of the decoder 110 to couple a voltage supply line of the HVAC communication bus 102 to the voltage supply input of the legacy HVAC monitoring device.

The control circuit 112 may be coupled to one or more relays 114 to control activation of the relays. The control circuit 112 may energize the relays 114 based upon HVAC communication bus messages decoded by the control circuit 112. One or more relays 114 may be connected between the supply input terminal and one or more output terminals of the decoder 110. For example, a first relay 114 may be coupled between the supply input terminal and the cool thermostat call output terminal, a second relay 114 may be coupled between the supply input terminal and the heat output terminal, and a third relay 114 may be coupled between the supply input terminal and the fan thermostat call output terminal. The control circuit 112 may be configured to energize the appropriate relay to emulate a legacy HVAC signal based upon a decoded message of the HVAC communication bus 102. For example, when the control circuit decodes a message indicating a call for heat, the control circuit 112 may energize or close the second "W" relay 114 to couple a 24VAC signal from the supply input terminal to the heat thermostat call output terminal to provide the 24VAC signal to a heat thermostat call input of the legacy HVAC monitoring device (e.g., to indicate that the furnace should be turned on). If a cool call message is decoded by the control circuit 112, the control circuit 112 may energize or close the first "Y" relay 114 to couple a 24VAC signal to the cool thermostat call output terminal to provide the 24VAC signal to a cool thermostat call input of the legacy HVAC monitoring device (e.g., to indicate that the compressor should be turned on). If a fan call message is decoded by the control circuit 112, the control circuit 112 may energize or close the third "G" relay 114 to couple a 24VAC signal to the fan thermostat call output terminal to provide the 24VAC signal to a fan thermostat call input of the legacy HVAC monitoring device (e.g., to indicate that the circulating fan should be turned on). Although three relays 114 are illustrated in FIG. 2, it is understood that other embodiments may include more or less relays.

The decoder 110 may include a power supply 116. The power supply 116 may be coupled to the supply input terminal of the decoder, and may be coupled to the control circuit 112 to provide a bias voltage supply. For example, the power supply 116 may receive a 24VAC signal from the supply input terminal of the decoder 110 and provide a five volt direct current (5VDC) signal to a bias input of the control circuit 112.

According to another example embodiment, a method of decoding an HVAC communication bus is shown in FIG. 3, referenced generally as method 200. At step, process, or operation 202, the method includes passively reading one or more messages transmitted on an HVAC communication bus. Alternatively, the method may include actively reading one or more messages transmitted on an HVAC communication bus. At step, process, or operation 204, the method includes decoding the one or more messages to determine a desired mode of operation called for by a thermostat connected to the HVAC communication bus. At step, process, or operation 206, the method includes energizing one or more relays to emulate a corresponding traditional HVAC legacy signal representing the mode of operation called for by the thermostat. At step, process, or operation 208, the method includes providing the emulated signal to a legacy HVAC system monitoring component.

Some of these example embodiments may allow a legacy HVAC system monitoring device to operate with a communicating HVAC system that may not use legacy 24VAC HVAC signals. The decoder may be configured to read messages on an HVAC communicating bus, and output legacy HVAC signals corresponding to the thermostat calls on the HVAC communicating bus, such that the legacy HVAC system monitoring device can interpret thermostat calls in the communicating HVAC system.

In exemplary embodiments, a bus decoder, device, or module is configured to monitor communications on a HVAC bus for the purpose emulating legacy thermostat output for connection to a HVAC monitoring device, which is configured for a non-communicating HVAC system. In some exemplary embodiments, the bus decoder, module, or device does not identify itself to the bus controller or any other networked device. The bus decoder, module, or device may be used to passively monitor digital communications signals on a residential HVAC bus and convert any equivalent digital messages into legacy calls.

In some exemplary embodiments, a bus decoder, device, or module includes a C, 1, 2, R connector that connects with a bus in a communicating system, where C is common, R is 24VAC, and 1 and 2 are for the bus, both transmit and receive. The bus controller compares message received on both lines 1 and 2, which should be the same (a method of error detection). The bus decoder also includes another connector (C, Y, W, G, R) that connects to an indoor data module. The C and R terminals are the same as the communications terminal. The Y terminal is for a 24VAC signal indicating that the compressor should be turned on (call for cool). The W terminal is for a 24VAC signal indicating that the furnace should be activated (a call for heat). The G terminal is for a 24VAC signal indicating that the circulating fan should be turned on, e.g., when a thermostat has initiated a call for cool or a user has manually activated the fan using a switch on the thermostat.

Continuing with this example, the 24VAC from the R terminal is used by an internal power supply to power an onboard microprocessor. The power supply rectifies the 24VAC to 24VDC and bucks the output down to 5VDC. This voltage is used to operate the microprocessor. The microprocessor uses the 5VDC to energize coils on three relays as a function of the commands from the bus. For example, if the thermostat decides that a call for cool is required, the thermostat will send a request for cooling out on the bus. This request is picked up by the microprocessor on an interface board. In response, the microprocessor will energize the relay for the Y terminal and the relay for the G terminal. This will send the 24VAC signal to the data module, which, in turn, will send the values to a remote server. In conjunction with this information and operation, the data module will also send the sensed current from the indoor unit to the remote server. In addition, information from duct sensors (supply and return), a liquid line sensor, and a suction line sensor may also be sent along to the server. The server will receive this information and analyze the information (e.g., using algorithms) to determine an operational status of the HVAC system.

In this example, 24VAC signals are used as inputs to the indoor data module because if the server receives information indicating that current is being consumed by the HVAC unit but there is no 24VAC input, then the server may determine that the system is faulty and that equipment is operating without control input from the thermostat. During operation, the indoor and outdoor data modules send information to the server for analysis. If the information is not consistent, an error condition exits.

In exemplary embodiments disclosed herein, a voltage supply line may provide a 24VAC signal, which is used by a power supply to power a microprocessor. The power supply may rectify the 24VAC to 24VDC and reduce the output down to 5VDC. The microprocessor may use the 5VDC to energize relay coils. Other exemplary embodiments may be configured for use with different alternating and/or direct current voltages, e.g., used with higher or lower voltages than 24VAC, 24VDC, or 5VDC whether VAC and/or VDC, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An HVAC communication bus decoder comprising:
a control circuit having an input for coupling to an HVAC communication bus; and
one or more relays each having an output for coupling to a legacy HVAC system monitoring component;
wherein the control circuit is configured to:
read one or more messages transmitted on the HVAC communication bus;
decode the one or more messages to determine a desired mode of operation called for by a thermostat connected to the HVAC communication bus; and
energize at least one of the one or more relays to emulate a corresponding HVAC legacy signal representing the mode of operation called for by the thermostat to be provided to the legacy HVAC system monitoring device.

2. The decoder of claim 1, wherein the legacy HVAC signal is a 24VAC signal.

3. The decoder of claim 1, further comprising:
a common input terminal for coupling to a common line of the HVAC communication bus;
a supply input terminal for coupling to a voltage supply line of the HVAC communication bus; and a first detection input terminal for coupling to a first communication line of the HVAC communication bus.

4. The decoder of claim 3, further comprising a second detection input terminal for coupling to a second communication line of the HVAC communication bus.

5. The decoder of claim 1, further comprising:
a common output terminal for coupling to a common input of the legacy HVAC system monitoring device;
a supply output terminal for coupling to a voltage supply input of the legacy HVAC system monitoring device; and
a first thermostat call output terminal for coupling to a thermostat call input of the legacy HVAC system monitoring device.

6. The decoder of claim 5, wherein:
the first thermostat call output terminal is a cool thermostat call output terminal for coupling to a cool thermostat call input of the legacy HVAC system monitoring device;
the decoder further comprises:
a heat thermostat call output terminal for coupling to a heat thermostat call input of the legacy HVAC system monitoring device; and
a fan thermostat call output terminal for coupling to a fan thermostat call input of the legacy HVAC system monitoring device.

7. The decoder of claim 6, further comprising a supply input terminal for coupling to a voltage supply line of the HVAC communication bus, wherein the one or more relays include:
a first relay coupled between the supply input terminal and the cool thermostat call output terminal;
a second relay coupled between the supply input terminal and the heat thermostat call output terminal; and
a third relay coupled between the supply input terminal and the fan thermostat call output terminal.

8. The decoder of claim 7, wherein:
the control circuit is coupled to the first detection input terminal;
the control circuit is configured to:
activate the first relay in response to decoding a call for cool on the HVAC communication bus;
active the second relay in response to decoding a call for heat on the HVAC communication bus; and
activate the third relay in response to decoding a call for fan on the HVAC communication bus.

9. The decoder of claim 1, wherein the control circuit is configured to detect a configuration of HVAC system equipment components connected to the HVAC communication bus.

10. The decoder of claim 1, further comprising a power supply coupled between a voltage supply line of the HVAC communication bus and the control circuit, the power supply configured to receive a 24VAC signal from the voltage supply line and provide a 5VDC bias supply to the control circuit.

11. The decoder of claim 1, wherein:
the control circuit comprises a microprocessor; and
the control circuit is configured to read the one or more messages passively without sending signals out on the HVAC communication.

12. An HVAC system comprising:
a communicating thermostat;
an indoor unit;
an outdoor unit;
an HVAC communication bus coupled to the thermostat, the indoor unit, and the outdoor unit;
a legacy HVAC system monitoring device; and
a decoder coupled between the HVAC communication bus and the legacy HVAC system monitoring device, the decoder configured to:
read one or more messages transmitted on the HVAC communication bus;
decode the one or more messages to determine a desired mode of operation called for by the thermostat; and
energize one or more relays to emulate a corresponding legacy HVAC signal representing the mode of operation called for by the thermostat to provide the emulated signal to the legacy HVAC system monitoring device.

13. The HVAC system of claim 12, wherein the decoder is configured to read the one or more messages passively.

14. The HVAC system of claim 12, wherein the legacy HVAC signal is a 24VAC signal, and wherein the one or more relays includes:
a first relay coupled to a cool thermostat call input of the legacy HVAC system monitoring device;
a second relay coupled to a heat thermostat call input of the legacy HVAC system monitoring device; and
a third relay coupled to a fan thermostat call input of the legacy HVAC system monitoring device.

15. A method of decoding an HVAC communication bus, the method comprising:
reading one or more messages transmitted on the HVAC communication bus;
decoding the one or more messages to determine a desired mode of operation called for by a thermostat connected to the HVAC communication bus;
energizing one or more relays to emulate a corresponding legacy HVAC signal representing the mode of operation called for by the thermostat; and
providing the emulated signal to a legacy HVAC system monitoring device.

16. The method of claim 15, wherein reading comprises reading the one or more messages passively without sending signals out on the HVAC communication bus.

17. The method of claim 15, wherein:
the legacy HVAC signal is a 24VAC signal; and/or
decoding includes detecting a configuration of HVAC equipment components connected to the HVAC communication bus.

18. The method of claim 15, wherein energizing includes energizing a first relay coupled to a cool thermostat call input of the legacy HVAC system monitoring device when a call for cool is decoded on the HVAC communication bus.

19. The method of claim 18, wherein energizing includes energizing a second relay coupled to a heat thermostat call input of the legacy HVAC system monitoring device when a call for heat is decoded on the HVAC communication bus.

20. The method of claim 19, wherein energizing includes energizing a third relay coupled to a fan thermostat call input of the legacy HVAC system monitoring device when a call for fan is decoded on the HVAC communication bus.

* * * * *